(12) United States Patent
Curtis et al.

(10) Patent No.: US 6,447,010 B1
(45) Date of Patent: Sep. 10, 2002

(54) SEAT BELT FORCE SENSOR SYSTEM

(75) Inventors: Brian M. Curtis, Lake Orion; Scott M. Morell, White Lake Township; Daniel A. Reich, Macomb; Michael Baker, Warren, all of MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/590,451

(22) Filed: Jun. 9, 2000

Related U.S. Application Data

(60) Provisional application No. 60/141,791, filed on Jun. 30, 1999.

(51) Int. Cl.[7] ............................................. B60R 22/48
(52) U.S. Cl. ..................... 280/801.1; 280/735; 297/468; 73/862.474
(58) Field of Search ................. 280/734, 735, 280/801.1, 801.2; 297/468, 469, 470; 73/862.474; 180/268

(56) References Cited

U.S. PATENT DOCUMENTS

| | | | | |
|---|---|---|---|---|
| 3,440,602 A | * | 4/1969 | Frig | ........................ 280/801.1 |
| 5,415,430 A | * | 5/1995 | Valasin | .................... 280/801.1 |
| 5,431,447 A | | 7/1995 | Bauer | |
| 5,454,591 A | | 10/1995 | Mazur | |
| 5,566,978 A | | 10/1996 | Fleming | |
| 5,626,359 A | | 5/1997 | Steffens | |
| 5,664,807 A | | 9/1997 | Bohmler | |
| 5,670,853 A | | 9/1997 | Bauer | |
| 5,906,393 A | | 5/1999 | Mazur | |
| 5,954,360 A | * | 9/1999 | Griggs, III et al. | ......... 280/735 |
| 5,965,827 A | * | 10/1999 | Stanley et al. | |
| 5,996,421 A | * | 12/1999 | Husby | |
| 6,007,093 A | * | 12/1999 | Bechtle | ...................... 280/735 |
| 6,079,745 A | | 6/2000 | Wier | |
| 6,081,759 A | * | 6/2000 | Husby et al. | ............. 280/801.1 |
| 6,161,439 A | * | 12/2000 | Stanley | ....................... 280/735 |
| 6,179,330 B1 | | 1/2001 | Wier | |
| 6,205,868 B1 | * | 3/2001 | Miller | |
| 6,209,915 B1 | * | 4/2001 | Blakesley | ................ 280/801.1 |

FOREIGN PATENT DOCUMENTS

| | | |
|---|---|---|
| DE | 38 17 042 A1 | 12/1988 |
| WO | WO99 12012 A1 | 3/1999 |
| WO | WO99 27337 A1 | 6/1999 |
| WO | WO99/ 29538 A1 | 6/1999 |

OTHER PUBLICATIONS

International Search Report, Aug. 14, 2000.

* cited by examiner

*Primary Examiner*—Brian L. Johnson
*Assistant Examiner*—Christopher Bottorff

(57) ABSTRACT

A system for measuring seatbelt forces is used to control deployment of vehicle airbags. The system includes a seatbelt anchor assembly having a bracket mounted to a vehicle structure adjacent to a vehicle seat. A seatbelt mechanism has a belt portion that is looped through the bracket. The seatbelt is used to secure passengers or an infant car seat to the vehicle seat. A sensor is engaged with the anchor assembly and is used to measure the magnitude of forces exerted on the seatbelt by the passenger or car seat. The sensor generates a signal representative of the seatbelt forces, which is used to control deployment of the airbag.

18 Claims, 3 Drawing Sheets

SEAT BELT FORCE SENSOR SYSTEM

RELATED APPLICATION

This application claims priority to provisional application 60/141,791 filed on Jun. 30, 1999.

BACKGROUND OF THE INVENTION

1. Field of the Invention

This invention relates to a method and apparatus for measuring the force applied to a seat belt. Specifically, a sensor arrangement is mounted within a seatbelt anchor assembly to provide accurate seatbelt force measurements.

2. Related Art

Most vehicles include airbags and seatbelt restraint systems that work together to protect the driver and passengers from experiencing serious injuries due to a high speed collision. It is important to control the deployment force of the airbags based on the size of the driver or the passenger. When an adult is seated on the vehicle seat, the airbag should be deployed in a normal manner. If there is an infant seat secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. If the sensors become damaged or fail to operate for some reason, the system will not provide accurate seat weight measurements and airbag deployment could occur under undesirable conditions.

Also mounting sensor systems within the seat can be difficult and time consuming. It is difficult to find mounting locations for each the sensors that will accommodate all of the various positions of a seated occupant while still providing accurate measurements. Further, shifting of the occupant on the seat can dislodge or move the sensors out of their proper location. Because the sensors are mounted within the seat bottom, it is difficult to reposition the sensors after the seat is installed in the vehicle.

Current sensor systems also can have difficulty determining whether an adult is belted to the seat or whether a child car seat is belted to the seat. When a child seat is in place, an excess acts on the sensors mounted within the rear portion of the seat, which interferes with accurate sensing of the weight of an occupant. Overtightening of the seatbelt, which makes it pull down on the rear of the seat, causes this force. Due to this effect, the current weight sensing systems have difficulty in discering between an adult and a child in a child seat.

Thus, it is desirable to have a system for determining whether conditions are proper for deploying an airbag by determining whether a child in a child seat or an adult is belted to the seat. The system should further provide accurate measurements, be easy to install, and should overcome the above referenced deficiencies with prior art systems.

SUMMARY OF THE INVENTION

In a disclosed embodiment of this invention, a system for measuring seatbelt forces includes a seatbelt anchor mounted to a vehicle structure adjacent to a vehicle seat and a seatbelt for securing an occupant to the vehicle seat. The seatbelt has a belt portion supported by the anchor. A sensor is engaged with the anchor for measuring the magnitude of forces exerted on the seat belt.

In a preferred embodiment, the seatbelt anchor is comprised of a bracket having a first portion with an opening for receiving the belt portion and a second portion for attaching the bracket to the vehicle structure. An airbag controller is used to control deployment of an airbag that is mounted within the vehicle near the seat. The sensor generates a signal representative of the seatbelt forces and transmits the signal to the controller. The airbag is prevented from deploying if the signal exceeds a predetermined limit.

The system includes at least one fastener that secures the anchor to the vehicle structure. Preferably, the sensor has a portion mounted between the fastener and the anchor.

A method for controlling airbag deployment includes the following steps. A seatbelt assembly is mounted adjacent to a vehicle seat with a seatbelt anchor. A force signal representative of forces applied to the seatbelt is generated via a sensor mounted to the seatbelt anchor. Deployment of an airbag is controlled based on the force signal. Preferably, deployment of the airbag is prevented if the signal exceeds a predetermined limit.

These and other features of the present invention can be best understood from the following specification and drawings, the following of which is a brief description.

DETAILED DESCRIPTION OF AN EXEMPLARY EMBODIMENT

Figure 1:
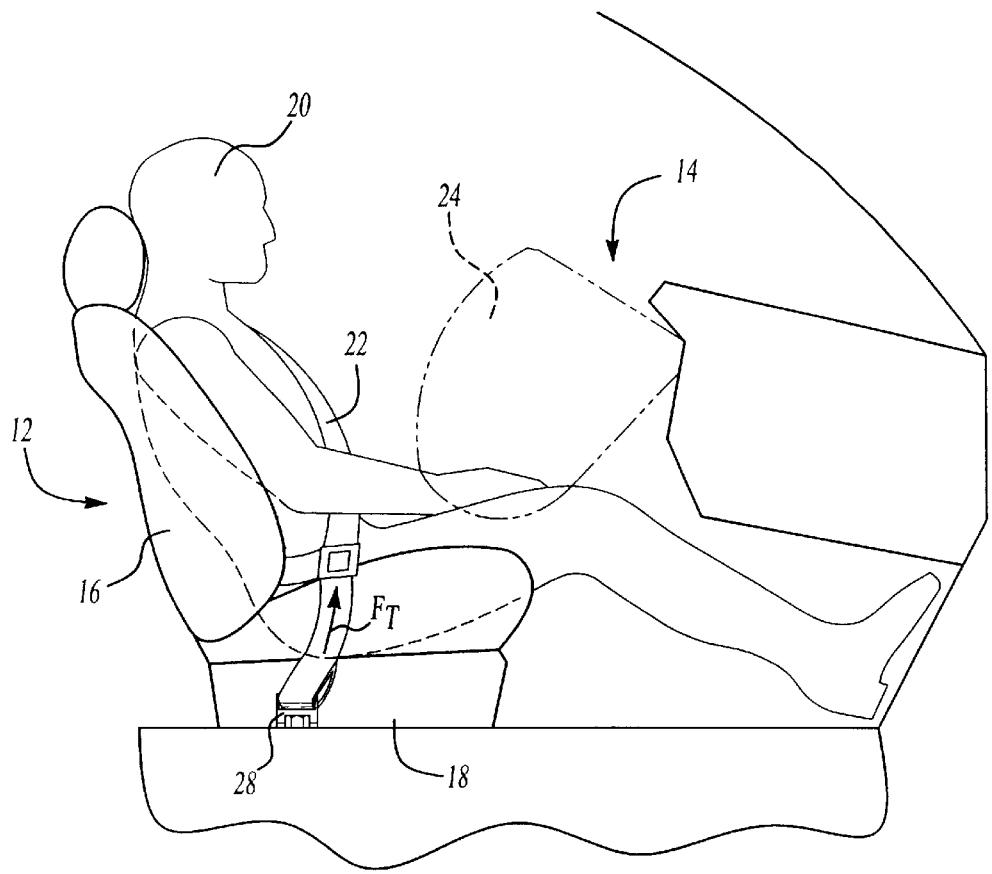
FIG. 1 is a schematic view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 is preferably a passenger seat and includes a seat back 16 and a seat bottom 18. A vehicle occupant 20 is secured to the seat 12 with a seatbelt 22. A tension force FT is exerted on the seatbelt 22. The tension force FT represents the force that the seat occupant 20 exerts against the seatbelt 22.

Figure 2:
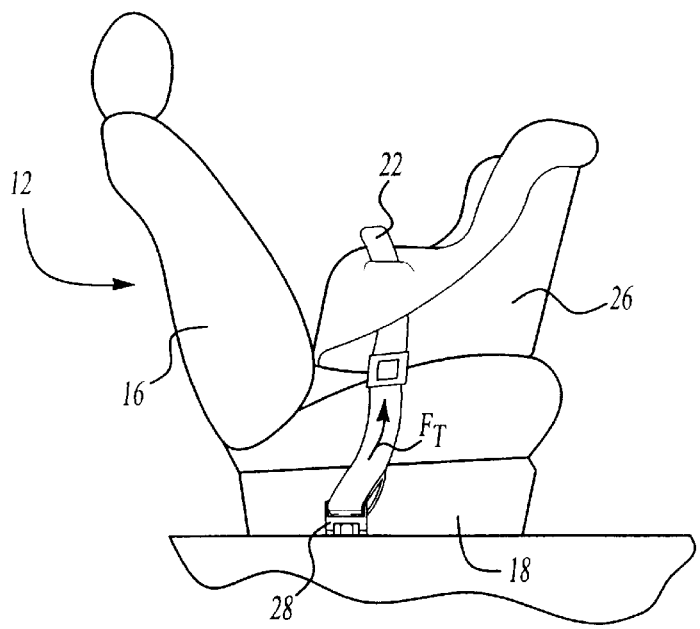
FIG. 2 is a side view of a seat assembly with an infant car seat secured to the vehicle seat.

The airbag system 14 deploys an airbag 24 under certain collision conditions. The deployment force for the airbag 24, shown in dashed lines in FIG. 1, varies depending upon the type of occupant that is belted to the seat 12. When an adult 20 is belted to the vehicle seat 12, the airbag 24 should be deployed in a normal manner shown in FIG. 1. If there is an infant or child seat 26 secured to the vehicle seat 12, see FIG. 2, then the airbag 24 should not be deployed. Thus, it is important to be able to determine whether there is an adult 20 belted to the seat 12 or whether an infant seat 26 is belted to the seat 12. One way to determine this is by monitoring the tension exerted on the seatbelt 22. When an adult 20 is belted to the seat, normal seatbelt forces are exerted against the seatbelt 22. When an infant or child seat 26 is belted to the seat 12 high forces are exerted against the seatbelt 22 because the seatbelt 22 is overtightened to securely hold the child seat 26 in place.

Figure 3:
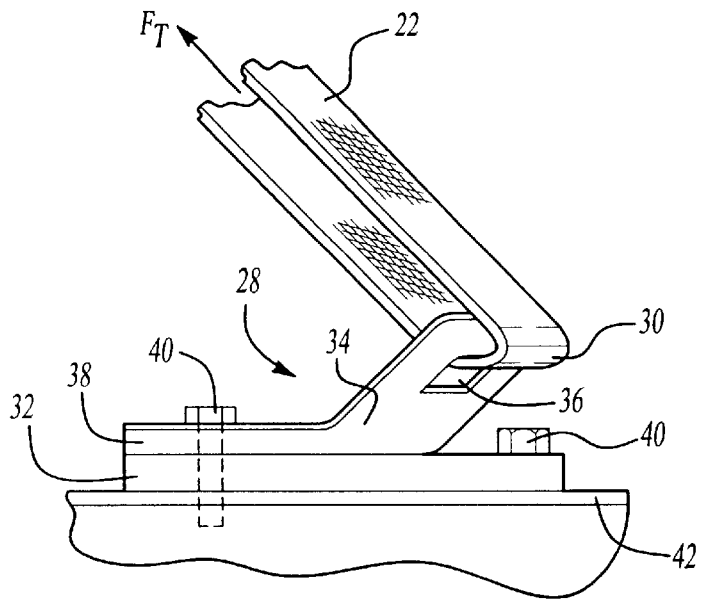
FIG. 3 is a perspective view of a seatbelt anchor assembly of the subject invention.

The subject invention provides a seatbelt force sensing system that is incorporated into a seatbelt anchor 28. The seatbelt anchor 28 is mounted to a vehicle structure adjacent to the vehicle seat 12. As shown in FIG. 3, the seatbelt 22 has a belt portion 30 that is supported by the anchor 28. A sensor 32 is engaged with the anchor 28 for measuring the magnitude of forces FT exerted on the seatbelt 22. The sensor 32 is preferably a load cell sensor with at least one strain gage however, other sensors known in the art could also be used.

Figure 4:
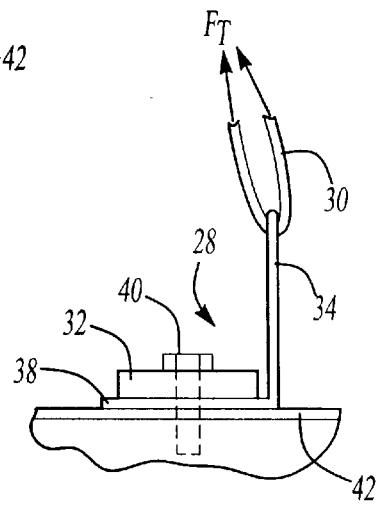
FIG. 4 is an alternate embodiment of the anchor of FIG. 3.

The seatbelt anchor 28 is a bracket that has a first portion 34 with an opening 36 for receiving the belt portion 30 and a second portion 38 for attaching the bracket 28 to the vehicle structure. The first portion 34 can be orientated at a non-perpendicular angle with respect to the second portion 38 as shown in FIG. 3 or can be mounted at a perpendicular angle with respect to the second portion 38 as shown in FIG. 4. The tension force $F_T$ that is exerted on the seatbelt 22 by the adult occupant 20 or the child seat 26 is directly translated to the anchor 28. The sensor 32 measures the tension force $F_T$ and deployment of the airbag 24 is controlled based on this measurement.

Figure 5:
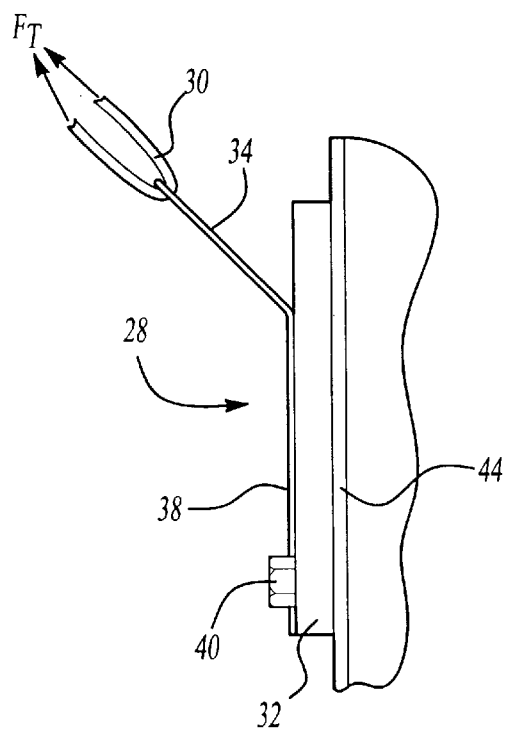
FIG. 5 is an alternate embodiment of a seatbelt anchor assembly of the subject invention.

At least one fastener 40 is used to fasten the second portion 38 to the vehicle structure. The vehicle structure can be a vehicle floor 42 as shown in FIG. 3 or can be a vehicle side pillar 44 as shown in FIG. 5. Preferably, some portion of the sensor 32 is mounted between the fastener 40 and the anchor 28.

Figure 6:
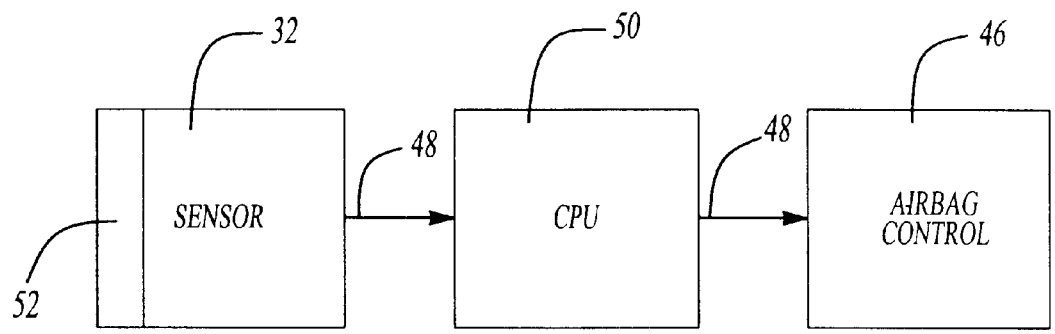
FIG. 6 is a schematic view of the airbag control system.

The sensing system communicates with an airbag controller 46 and central processor 50, shown in FIG. 6, which controls the deployment of the airbag 24. The sensor 32 generates a signal 48 representative of the forces $F_T$ and transmits the signal 48 to the controller 46. As discussed above, the sensor 32 is preferably a load cell sensor with at least one strain gage 52. The operation of such sensors and gages are well known in the art. The processor 50 and controller 46 can be separate units or can be incorporated into a single unit. The airbag 24 is prevented from deploying if the signal 48 exceeds a predetermined limit. Thus, when the sensor 32 measures a high tension force $F_T$ on the seatbelt 22 it is determined that a child seat 26 is belted to the vehicle seat 12 and the airbag 24 will not be deployed.

Figure 7:
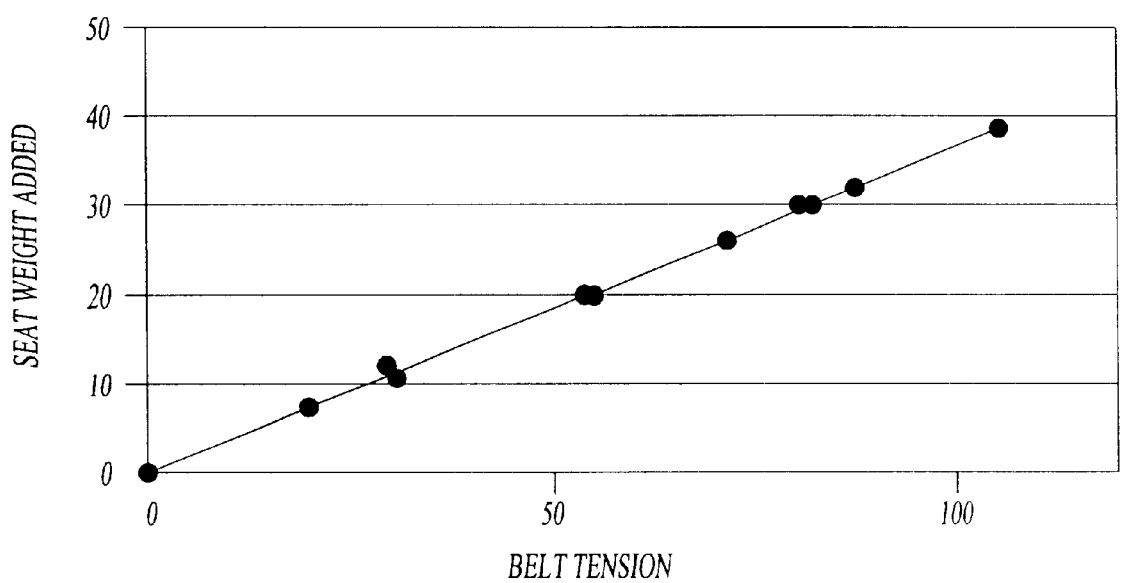
FIG. 7 is graph representing seat weight added vs. seatbelt tension.

The measurement of the tension force $F_T$ from the seat belt 22 can be utilized in various ways. One way is to set a predetermined limit for $F_T$ such that when $F_T$ exceeds the predetermined limit it is known that a child seat 26 and not an adult 20 is belted to the seat 12. Another way is to measure both the weight applied to the vehicle seat 12 and the tension force $F_T$ on the seatbelt 22 to determine whether an adult 20 or child seat 26 is belted to the seat 12. These are only examples of how the $F_T$ measurement can be used, it should be understood that $F_T$ could be used in other ways depending on various control parameters. As shown in FIG. 7, there is a generally linear relationship between the seat weight added to the vehicle seat 12 and the belt tension.

The method for controlling airbag deployment includes the following steps. A seatbelt 22 is mounted adjacent to a vehicle seat 12 with a seatbelt anchor 28. A force signal 48 representative of forces $F_T$ applied to the seatbelt 22 is generated via a sensor 32 mounted to the seatbelt anchor 28. Deployment of the airbag 24 is controlled based on the force signal 48. Preferably, deployment of the airbag 24 is prevented if the signal 48 exceeds a predetermined limit.

The subject sensing system provides simplified and efficient apparatus and method for determining whether conditions are proper for deploying an airbag 24 by measuring seatbelt forces to discern whether a child in a child seat 26 or an adult is belted to the seat 12. The system provides accurate measurements and is easy to install.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A system for measuring seatbelt forces comprising:
   a single seatbelt anchor bracket having an upper end and a lower end;
   a seatbelt having a belt portion supported solely by said upper end wherein said belt portion exerts a tension force on said upper end in response to securing an occupant to a vehicle seat with said seatbelt;
   a sensor mounted directly to said bracket for measuring said tension force;
   at least one fastener extending through said lower end of said bracket to secure said sensor and said bracket to a vehicle structure adjacent to the vehicle seat; and
   wherein said fastener extends through said sensor.

2. A system according to claim 1 wherein said sensor includes a longitudinally extending body that is parallel to said vehicle structure.

3. A system for measuring seatbelt forces comprising:
   a single seatbelt anchor bracket having an upper end and a lower end;
   a seatbelt having a belt portion supported solely by said upper end wherein said belt portion exerts a tension force on said upper end in response to securing an occupant to a vehicle seat with said seatbelt;
   a sensor mounted directly to said bracket for measuring said tension force;
   at least one fastener extending through said lower end of said bracket to secure said sensor and said bracket to a vehicle structure adjacent to the vehicle seat; and
   wherein said sensor is positioned between said lower end of said bracket and said vehicle structure with said upper end of said bracket being spaced apart from said sensor and said vehicle structure.

4. A system according to claim 3 wherein said sensor is flush with said vehicle structure.

5. A system according to claim 3 wherein said upper end of said bracket includes a single opening for receiving said belt portion comprised of a single belt loop.

6. A system according to claim 5 wherein said opening is vertically higher on said anchor bracket than said sensor.

7. A system according to claim 3 including an airbag controller for deploying an airbag wherein said sensor generates a signal representative of said tension force and transmits said signal to said controller wherein said airbag is prevented from deploying if said signal exceeds a predetermined limit.

8. A system for measuring seatbelt forces comprising:
   a single seatbelt anchor bracket having an upper end and a lower end;

a seatbelt having a belt portion supported solely by said upper end wherein said belt portion exerts a tension force on said upper end in response to securing an occupant to a vehicle seat with said seatbelt;

a sensor mounted directly to said bracket for measuring said tension force;

at least one fastener extending through said lower end of said bracket to secure said sensor and said bracket to a vehicle structure adjacent to the vehicle seat; and wherein said sensor is positioned directly between said fastener and said lower end of said bracket.

9. A system for measuring seatbelt forces comprising:

a single seatbelt anchor bracket having an upper end and a lower end;

a seatbelt having a belt portion supported solely by said upper end wherein said belt portion exerts a tension force on said upper end in response to securing an occupant to a vehicle seat with said seatbelt;

a sensor mounted directly to said bracket for measuring said tension force;

at least one fastener extending. through said lower end of said bracket to secure said sensor and said bracket to a vehicle structure adjacent to the vehicle seat; and wherein said at least one fastener includes a first fastener for securing one end of said sensor to said bracket and a second fastener for securing an opposite end of said sensor to said vehicle structure.

10. A method for measuring seatbelt forces for controlling an airbag device comprising the steps of:

(a) mounting a single seatbelt anchor bracket to a vehicle structure;

(b) securing a seatbelt portion solely to an upper end of the anchor bracket;

(c) mounting a sensor directly to a lower end of the bracket with at least one fastener;

(d) applying a tension force on the upper end of the bracket in response to securing an occupant to a vehicle seat with a seatbelt;

(e) measuring the tension force with the sensor; and (f) generating a force signal representative of the tension.

11. A method according to claim 10 wherein step (c) further includes fastening the lower end of the bracket and the sensor to the vehicle structure with the fastener.

12. A method according to claim 11 including the step of controlling deployment of an airbag based on the force signal.

13. A method according to claim 12 including the step of preventing deployment of the airbag if the signal exceeds a predetermined limit.

14. A method according to claim 10 wherein step (c) further includes orientating the sensor vertically lower than the belt portion and parallel to the vehicle structure.

15. A method according to claim 14 wherein step (c) further includes orientating the sensor flush with the lower end of the bracket.

16. A method according to claim 10 wherein step (c) further includes positioning the sensor between the lower end of the bracket and the vehicle structure.

17. A method according to claim 10 wherein step (c) further includes positioning the sensor directly between the fastener and the lower end of the bracket.

18. A system for measuring seatbelt forces for controlling an airbag assembly comprising:

a single seatbelt anchor bracket having an upper end with a single opening and a lower end mountable to a vehicle structure;

a seatbelt having a single belt portion looped through said opening and supported solely by said upper end wherein said belt portion exerts a tension force on said upper end of said anchor bracket in response to securing an occupant to a vehicle seat with said seatbelt;

a sensor mounted directly to said anchor bracket at a vertically lower position than said opening for measuring said tension force, said sensor including a longitudinally extending body that is parallel to said vehicle structure and flush with said lower end of said anchor bracket;

at least one fastener extending through said lower end of said anchor bracket to secure said sensor and said anchor bracket to said vehicle structure adjacent to the vehicle seat; and an airbag controller for deploying an airbag wherein said sensor generates a signal representative of said tension force and transmits said signal to said controller wherein said airbag is prevented from deploying if said signal exceeds a predetermined limit.

\* \* \* \* \*